Patented July 29, 1952

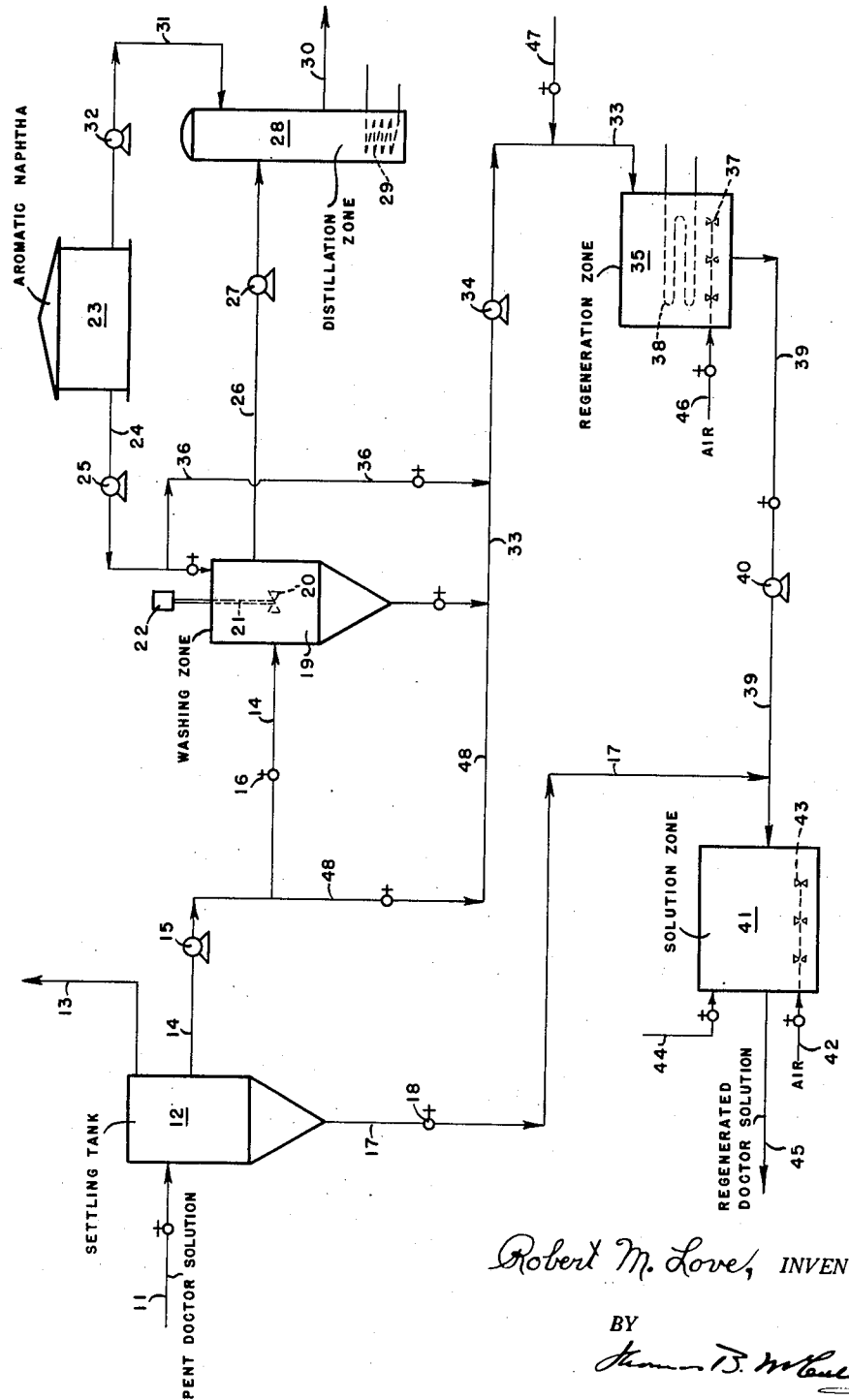

2,605,165

UNITED STATES PATENT OFFICE 2,605,165

PROCESS FOR REGENERATION OF SPENT DOCTOR SOLUTIONS

Robert M. Love, Baytown, Tex., assignor, by mesne assignments, to Standard Oil Development Company, Elizabeth, N. J., a corporation of Delaware Application March 13, 1948, Serial No. 14,684

12 Claims. (Cl. 23—51)

1

This invention is concerned with a method of improving the regeneration of spent doctor solutions. More specifically, it concerns a method for increasing the rate of regeneration of doctor solutions spent in the treatment of mercaptan-bearing oils.

It is well known to sweeten either virgin naphthas produced by the catalytic or thermal cracking of virgin hydrocarbon oils, which contain obnoxious mercaptans, by treatment of such materials with a doctor solution (an alkali metal plumbite) and with element sulfur. In order to eliminate excessive loss of costly lead compounds, the spent doctor solution, which comprises lead sulfides formed during the sweetening step and entrained naphtha, is regenerated for reuse in the sweetening cycle. This is usually accomplished by blowing the spent doctor solution with air or other oxidizing medium. Quite frequently, when the equipment employed in the doctor sweetening process is being operated at maximum capacity, such large quantities of spent doctor solution are produced that either considerable time is required to carry out the regeneration step or there is not sufficient capacity in the regeneration equipment to handle all of the spent solution. Consequently, large quantities of the spent solution must either be discarded or stored for long periods of time. It would be extremely desirable, therefore, to find a procedure for increasing the rate at which spent doctor solutions can be regenerated.

It is known that many virgin and all cracked naphthas contain olefinic constituents. There is very good reason to believe that some of the olefins present in such naphthas are carried along with spent doctor solution to the regeneration operations. During the air-treating operation these olefinc bodies evidently are polymerized or oxidized to polymers and gums which tend to deposit on the particles of lead sulfite as the naphtha is evaporated from the slurry during the oxidation step. The deposition of such materials on the lead sulfide particles is believed to result in the formation of a viscous, gummy film which interferes with the diffusion of lead sulfide and, consequently, retards the oxidation of this material to soluble lead compounds. I have found that maintaining aromatic hydrocarbons in the slurry during the regeneration step increases the

2 regeneration rate. This is probably because the gummy bodies are kept in solution which makes it possible to obtain efficient contact between the oxygen and lead sulfide particles. Thus, I have found a simple and inexpensive procedure for accomplishing the accelerated regeneration of such solutions.

It is, therefore, the chief object of the present invention to provide a means of carrying out the accelerated regeneration of doctor solutions spent in the sweetening of sour naphthas.

Other objects of the present invention will become apparent from a reading of the following description and claims of my invention.

Briefly, the present invention comprises washing a spent doctor solution with an aromatic-type hydrocarbon solvent, settling the washed material to separate a major portion of the aromatic solvent from the spent solution and contacting the spent washed doctor solution containing a minor portion of aromatic solvent with a free oxygen containing gas at an elevated temperature to form regenerated doctor solution. If desired, the washing step may be eliminated and aromatics may be added to the spent solution before regeneration. The regeneration operation may be carried out either on the total spent doctor solution or on the slurry layer obtained by settling the spent doctor solution.

In order to describe more completely one method of carrying out my invention, reference is made to the sole figure in the form of a flow diagram illustrating several embodiments thereof.

Turning now to the drawing, the numeral 11 designates a line through which is pumped doctor solution received from a conventional treating zone not shown. This solution will have been formed by treatment of a mercaptan-bearing oil with fresh or regenerated doctor solution containing appreciable quantities of soluble lead and with elemental sulfur. The solution is separated from the sweetened naphtha. Appreciable quantities of lead sulfides will be present therein. The solution containing the lead sulfides is withdrawn from the oil and pumped through line 11 into settling tank 12 wherein it is settled into three layers, a top layer which comprises naphtha and which is withdrawn through line 13, a middle slurry or emulsion layer containing the bulk of the lead sulfide precipitate emulsified with oil and caustic which is withdrawn through line 14 containing pump 15 and valve 16, and a bottom layer of caustic containing a small amount of dissolved lead which is withdrawn through line 17 containing valve 18. The middle slurry layer is charged into washing zone 19 into which extends an agitating means 20 connected to shaft 21 and rotated by prime mover 22.

Storage vessel 23 contains an aromatic naphtha containing over about 50 per cent aromatics. A portion of this naphtha is withdrawn through line 24 containing pump 25 and is charged into washing zone 19 wherein the slurry and aromatic naphtha are thoroughly mixed by means of stirring device 20. After the materials have been thoroughly contacted, the stirring operation is discontinued and the contents of the washing zone are allowed to settle. Aromatic naphtha is withdrawn as a top layer from zone 19 through line 26 containing pump 27 and is charged, if desired, into distillation zone 28 containing heating means 29. In this distillation operation, high boiling gums and polymers removed from the slurry in washing zone 19 and dissolved in the aromatic naphtha are removed as a high boiling fraction through line 30. Aromatic naphtha substantially free of the high boiling gums and polymers is withdrawn through line 31 containing pump 32 and is subsequently passed to storage tank 23. The washed slurry layer settling in the bottom of tank 19 is withdrawn through line 33 containing pump 34 and is passed to a regeneration zone such as tank 35. If desired, a small amount of aromatic naphtha may be added to the withdrawn slurry by lines 24 and 36 and blended with the slurry passing through line 33.

The washed slurry containing a minor portion of aromatic naphtha is then contacted with a free oxygen containing gas such as air which is introduced into tank 35 through line 46 and distributing device 37. The contents of tank 35 may be heated, if desired, by heating means 38 which may suitably comprise a steam coil. It is usually preferable to maintain the temperature of the material being regenerated at a temperature of from about atmospheric to 350° F. in order to obtain the most efficient regeneration rate. After the air-blowing operation has continued for a period of several hours, substantially all of the lead sulfides in the doctor solution are converted to soluble lead compounds such as lead oxide and lead thiosulfate.

If desired, an alkali metal hydroxide solution may be added to the washed slurry before the regeneration step. This may be accomplished by introducing an aqueous alkaline solution through line 47 and combining it with the washed slurry passing through line 33 into regeneration zone 35.

The regenerated solution is then withdrawn from the tank 35 through line 39 containing pump 40 and is routed to solution zone 41. The clear spent doctor solution withdrawn by line 17 from settling tank 12 may be mixed with the regenerated doctor solution and the combined stream passed to solution zone 41. A free oxygen-containing gas, such as air, is then passed through line 42 and distributing means 43 into zone 41 such that the contents thereof may be agitated to cause solution of oxidized lead salts in the mixture and to oxidize any lead sulfides remaining in the combined streams. If desired, additional alkali metal hydroxide solution may be added to the contents of solution tank 41 by means of line 44. The regenerated doctor solution may then be withdrawn from zone 41 through line 45 and passed to the sweetening zone, not shown.

If desired, the washing operation may be carried out by washing the total spent doctor solution passing through line 11 with aromatic naphtha without carrying out the intermediate settling operation. This procedure is not always desirable since very large volumes of spent solution must then be passed to the regeneration zone for contacting with the free oxygen-containing gas. Under some conditions, however, the settling operation may not be desired and efficient results may be obtained without including this particular step. The washing step may be carried out in several mixing zones or in a countercurrent treating tower wherein slurry is introduced at the top and naphtha is introduced at the bottom of the tower and the materials passed through efficient contacting means such as bell cap trays or the like.

Another modification of my invention which is preferred in some operations where a preliminary washing step is not required comprises passing slurry through lines 14, 48 and 33 directly to regeneration zone 35. Aromatic naphtha is added by way of line 36 to the slurry passing through line 33. A substantial volume of naphtha is added to provide from about 2 to 40% by volume of aromatic hydrocarbons based on the naphtha-slurry mixture. The total spent reagent may also be passed directly from line 11 to line 48 without the intermediate settling operation and aromatics added as described above.

In some cases it may be desirable to remove the aromatic naphtha from the regenerated doctor solution before it is recycled to the sweetening process. This may be accomplished conveniently by steam distilling the regenerated solution withdrawn through line 39 from regeneration zone 35. In other cases it may be desired to steam distill the washed slurry withdrawn from washing zone 19. If this steam distillation operation is carried out, however, it will be necessary to add aromatic naphtha to the steam distilled slurry before it is passed to regeneration zone 35.

The beneficial results to be obtained from the practice of my invention will now be described in conjunction with various examples. Mercaptan-bearing naphthas boiling from about 100° F. to 450° F., having copper numbers in the range of 10 to 25, and having olefin contents of about 15 volume per cent were contacted with doctor solutions having soluble lead contents of from 0.05 to 0.20 pound per gallon and with sufficient sulfur to break out lead sulfides from the treated solution. The spent doctor solutions withdrawn from the sweetening process having soluble lead contents of substantially zero pound of lead per gallon of doctor solution were then settled for a period of about four hours. The middle slurry or emulsion layer withdrawn from the settled product was then pretreated under various conditions and regenerated with constant amounts of air at a temperature of 150° F. In each case analyses were obtained at definite periods on the doctor solution undergoing the oxidation treatment in order to determine when the formation of soluble lead in the regenerated mixture was substantially complete. The time required to regenerate each slurry was then used in calculating the regeneration rate which is reported as pound of lead oxide per gallon of slurry treated per hour.

In each case a blank run was made in which untreated slurry was oxidized under constant conditions. The pretreatment operations included washing the slurry before regeneration with a paraffinic naphtha boiling from about 100° to 200° F., with an aromatic naphtha boiling from 325° to 550° F. or, with toluene, steam distilling the slurry, or steam distilling the slurry followed by adding a small amount of aromatic naphtha before oxidation.

The results of these various runs are shown in the following table:

| Slurry Employed | A | | | | B | | | C | | |
|---|---|---|---|---|---|---|---|---|---|---|
| Pretreatment of Lead Slurry: | | | | | | | | | | |
| Naphtha Wash Employed [1] | None | ² Naphtha | Toluene | ³ Naphtha | None | ³ Naphtha | None | None | ³ Naphtha | None |
| Vol. percent based on slurry | 0 | 100 | 100 | 100 | 0 | 10 | 0 | 0 | 10 | 0 |
| Slurry Steam Distilled | | | | | | | Yes | | | Yes |
| Aromatic naphtha added to steam distilled slurry, Vol. percent | | | | | | | None | | | 1.25 |
| Regeneration of Slurry: | | | | | | | | | | |
| Naphtha remaining in slurry, Vol. percent | 0 | 10 | 20 | 17 | 0 | 4.0 | 0 | 0 | 4.0 | 1.25 |
| Aromatics remaining in slurry, Vol. percent | 0 | 1.0 | 20 | 15 | 0 | 3.4 | 0 | 0 | 3.4 | 1.1 |
| Regeneration rate, Pound of lead/gallon of slurry per hour | 0.0036 | 0.0045 | 0.010 | 0.0094 | 0.0012 | 0.0024 | 0.0011 | 0.0010 | 0.0021 | 0.0015 |
| Increase in regeneration rate, per cent | | 25 | 180 | 160 | | 100 | −8 | | 110 | 50 |
| Pound lead regenerated per gallon of slurry during regeneration period | 0.2 | 0.2 | 0.2 | 0.2 | 0.15 | 0.15 | 0.15 | 0.15 | 0.15 | 0.15 |

[1] Slurry washed with naphtha, the mixture settled and the slurry was then separated from naphtha.
² Paraffinic naphtha containing 10 volume percent aromatics and boiling in the range of 100° to 200° F.
³ Aromatic naphtha containing 85 volume percent aromatics and boiling in the range of 325° to 550° F.

It will be noted that washing the slurry before regeneration with 100% volume of paraffinic naphtha resulted in very little improvement in the regeneration rate. It is also noted that steam distillation of the slurry prior to regeneration resulted in no improvement in the regeneration rate. Washing the slurry with as little as 10% volume of kerosene extract, withdrawing the major portion of the extract and oxidizing the slurry containing 3.4% by volume of aromatic hydrocarbons increased the regeneration rate about 100% over that obtained when no pretreatment operation was employed. Washing the slurry with 100% by volume of either high boiling aromatic naphtha or toluene and then regenerating the slurries containing 15 and 20 volume per cent aromatic hydrocarbons, respectively, resulted in increasing the regeneration rate appreciably as compared to that obtained when no pretreatment was employed. Steam distillation of the slurry followed by adding about one volume per cent of aromatic hydrocarbons increased the regeneration rate very slightly.

The amount of aromatics maintained in the spent doctor solution during regeneration will depend to some extent on the type of hydrocarbon oil originally sweetened. For example, sweetening virgin naphthas containing only small quantities (below 1%) of olefins will result in a spent reagent which may be effectively regenerated when containing only about 2 to 5% aromatic hydrocarbons. Spent reagents from sweetening operations on cracked distillates containing 10% and higher concentrations of olefins will be most effectively regenerated when they contain from about 10 to 40% of aromatic hydrocarbons. If the slurry or reagent is washed prior to the regeneration step, less aromatic hydrocarbons need to be present as a rule during the regeneration step than is the case where the washing step is eliminated and aromatics are added directly to the reagent or slurry before the air blowing step.

The aromatic wash naphtha used in the practice of my invention preferably should contain over about 50 weight per cent aromatics and preferably from about 75 to 100 weight per cent aromatics. The aromatic wash naphtha or solvent may conveniently be a pure hydrocarbon such as benzene, toluene, any one of the xylenes or a mixture thereof, and the higher members of the same homologous series boiling up to 550° F. It is preferred, however, to employ as an aromatic hydrocarbon solvent a fraction boiling in the range from about 325° to about 550° F.

The aromatic naphthas may be produced conveniently by extracting an aromatic-containing naphtha with liquid sulfur dioxide at reduced temperatures to form an extract phase, removing $SO_2$ from the extract phase and recovering the aromatic extract containing from 85 to 95% aromatics. Other procedures, which are well known to the art will produce aromatic naphthas containing the desired concentration of aromatics.

Conditions adapted to maintain the aromatic hydrocarbon naphtha or solvent in the liquid phase during the regeneration step will vary depending upon the boiling range of the aromatic solvent and the desired temperature at which air-blowing of the slurry is conducted. When regenerating at atmospheric pressure, the naphtha should have an initial boiling point of above about 250° F. and preferably should boil from about 300° to 550° to 600° F. Naphthas boiling below about 250° F., such as benzene and toluene, volatilize rapidly from the slurry during the regeneration step carried out at elevated temperature and atmospheric pressure; consequently, they cannot act as a solvent for the gum-forming bodies during this particular operation. If the air-blowing operation is carried out in pressure equipment such that the operating pressures may be as high as 100 to 200 pounds per square inch, the lighter aromatic solvents such as toluene or benzene may be present in the material being regenerated even at temperatures as high as 300° F. Straight run light petroleum distillates of low aromatic content are usually undesirable for use in the practice of my invention because sufficient aromatic hydrocarbons do not remain in the regenerating slurry to act as effective solvents during the regeneration step.

In the appended claims, the terms "spent alkali metal plumbite solution" and "alkali metal plumbite solution spent in the sweetening of mercaptan-bearing oils" will be understood not only to include the aqueous solution of inorganic compounds, such as alkali metal hydroxide and alkali metal plumbite, but also to include undissolved compounds such as lead sulfides and insoluble oil commonly suspended in spent doctor solutions separated from the bulk of the treated oil.

I do not intend to be limited to any theory as to the mode by which improved results are obtained in my invention. The regeneration of any spent alkali metal plumbite solution in the presence of aromatic hydrocarbons will fall within the spirit and scope of the disclosures given in this specification and following claims.

The nature and objects of the present invention having been fully described and illustrated, what I wish to claim as new and useful and to secure by Letters Patent is:

1. A method for regenerating spent alkali metal plumbite solution which includes the steps of adding to said solution a liquid hydrocarbon phase comprising a major portion of aromatic hydrocarbon in an amount sufficient to dissolve substantially all polymers and gums formed therein, and contacting said solution with a free oxygen-containing gas in the presence of said added liquid.

2. A method for regenerating spent alkali metal plumbite solution which comprises washing the spent solution with an aromatic hydrocarbon solvent boiling above about 175° F., removing a portion of said solvent from the spent solution, contacting said solution in the presence of about 2% to about 40% by volume of said aromatic hydrocarbon solvent with a free oxygen-containing gas under conditions adapted to maintain said hydrocarbon solvent in liquid phase, and recovering a regenerated plumbite solution suitable for sweetening mercaptan-bearing hydrocarbons.

3. A method for regenerating alkali metal plumbite solutions spent in the sweetening of mercaptan-bearing oils which includes the steps of separating a slurry layer comprising lead sulfide, alkali metal hydroxide solution, and oil from the spent solution, adding to said slurry an aromatic hydrocarbon solvent boiling in the range between about 175° and about 550° F. in an amount ranging from about 2% to about 40% by volume, contacting said slurry and said solvent with a free oxygen-containing gas under conditions adapted to maintain said solvent in liquid phase, and recovering a solution suitable for sweetening mercaptan-bearing oils.

4. A method for regenerating alkali metal plumbite solutions spent in the sweetening of mercaptan-bearing oils which comprises the steps of forming an admixture comprising a major portion of said spent solution and from about 2% to about 40% by volume of an aromatic hydrocarbon solvent boiling within the range between about 175° and about 550° F., contacting said admixture with free oxygen-containing gas under conditions adapted to maintain said solvent in liquid phase, and recovering regenerated solution suitable for sweetening mercaptan-bearing oils.

5. In the regeneration of alkali metal plumbite reagent spent in the sweetening of mercaptan-bearing oils which includes the step of contacting the spent reagent with a free oxygen-containing gas at an elevated temperature to convert lead sulfides therein into soluble lead compounds, the improvement which comprises adding to the spent reagent an aromatic hydrocarbon solvent boiling within the range from about 175° to about 550° F., agitating said solvent with said reagent to remove gum-forming materials therefrom, separating a portion of the solvent from resulting washed reagent, passing to said regeneration zone washed reagent containing from about 2% to about 40% by volume of said aromatic hydrocarbon solvent, and maintaining said solvent in liquid phase during contacting with said gas.

6. In a method for oxidizing lead sulfides in alkaline metal plumbite solutions spent in sweetening mercaptan-bearing oils to soluble lead salts which includes the step of contacting the lead sulfides with free oxygen-containing gas, the improvement which comprises admixing with said lead sulfides a solvent comprising a major portion of liquid aromatic hydrocarbons and maintaining in liquid phase in the presence of said lead sulfides during said contacting step an amount of said solvent sufficient to dissolve substantially all polymers and gums formed therein.

7. A method for oxidizing lead sulfides in alkali metal plumbite solutions spent in the sweetening of mercaptan-bearing oils to soluble lead salts which comprises the steps of settling said spent solution, separating a slurry comprising lead sulfide and an alkali metal hydroxide solution from said spent solution, washing said slurry with an aromatic hydrocarbon solvent boiling within the range between about 175° F. and about 550° F., separating a washed slurry containing from about 2% to about 40% by volume of said solvent, and contacting said slurry and said solvent with a free oxygen-containing gas under conditions adapted to maintain said solvent in liquid phase to convert lead sulfides to soluble lead salts.

8. In the regeneration of alkali metal plumbite solutions spent in the sweetening of mercaptan-bearing oils which includes the steps of separating a slurry comprising lead sulfide and an alkali metal hydroxide solution from said spent solution and contacting said slurry with a free oxygen-containing gas for a period of time sufficient to convert lead sulfides to soluble lead compounds, the improvement which comprises agitating said slurry with an aromatic hydrocarbon solvent boiling above about 175° F., separating a washed slurry-aromatic hydrocarbon solvent mixture containing aromatics in the range of 2% to 40% by volume based on the total mixture, charging said slurry-aromatic hydrocarbon mixture to said regeneration step, and maintaining said aromatic hydrocarbon solvent in liquid phase during contacting with said gas.

9. A method in accordance with claim 8 in which the aromatic hydrocarbon-solvent contains at least 50% aromatics.

10. A method in accordance with claim 8 in which the aromatic hydrocarbon solvent is benzene.

11. A method in accordance with claim 8 in which the aromatic hydrocarbon solvent is toluene.

12. A method in accordance with claim 8 in which the aromatic hydrocarbon solvent is an aromatic naphtha boiling between 325° F. and 550° F.

ROBERT M. LOVE.

REFERENCES CITED

The following references are of record in the file of this patent:

UNITED STATES PATENTS

| Number | Name | Date |
|---|---|---|
| 1,667,550 | Hill | Apr. 24, 1928 |
| 2,022,550 | Stone et al. | Nov. 26, 1935 |

(Other references on following page)

UNITED STATES PATENTS

| Number | Name | Date |
|---|---|---|
| 2,022,558 | Dooley, Jr. | Nov. 26, 1935 |
| 2,029,288 | Bray | Feb. 4, 1936 |
| 2,035,455 | Bjerregaard | Mar. 31, 1936 |
| 2,081,496 | Merrill | May 25, 1937 |
| 2,309,692 | Chettick et al. | Feb. 2, 1943 |

OTHER REFERENCES

Ott and Reid, "Reactions of Some Mercaptans with Alkaline Sodium Plumbite Solutions," Ind. and Eng. Chem. vol. 22, No. 8, August 1930, pp. 878 to 881.

"Regenerating Litharge for Sodium Plumbite Doctor," Chem. and Met. Eng., vol. 38, No. 2, February 1931, pp. 76, 77.

Lee, Adams and McSweeney, "Drying Oils and Resins from Petroleum Sources," Paint, Oil and Chem. Review, January 8, 1948, pp. 16 to 25.